United States Patent
Eisen et al.

(10) Patent No.: US 9,420,191 B2
(45) Date of Patent: Aug. 16, 2016

(54) SENSOR FOR CAPTURING A MOVING MATERIAL WEB

(71) Applicant: Texmag GmbH Vertriebsgesellschaft, Thalwil (CH)

(72) Inventors: Juergen Eisen, Augsburg (DE); Lars Zwerger, Augsburg (DE)

(73) Assignee: TEXMAG GMBH VERTRIEBSGESELLSCHAFT, Thalwil (CH)

( * ) Notice: Subject to any disclaimer, the term of this patent is extended or adjusted under 35 U.S.C. 154(b) by 156 days.

(21) Appl. No.: 13/970,386

(22) Filed: Aug. 19, 2013

(65) Prior Publication Data

US 2014/0063310 A1    Mar. 6, 2014

(30) Foreign Application Priority Data

Aug. 28, 2012 (EP) ..................................... 12006112

(51) Int. Cl.
*H04N 5/235* (2006.01)
*G01B 11/00* (2006.01)

(52) U.S. Cl.
CPC ................. *H04N 5/235* (2013.01); *G01B 11/00* (2013.01)

(58) Field of Classification Search
CPC .... G01N 21/86; G01N 2021/8663–2021/8681
USPC ............................... 250/548, 559.01–559.49; 356/237.1–241.6, 369, 445–448, 356/429–431; 73/159; 348/311
See application file for complete search history.

(56) References Cited

U.S. PATENT DOCUMENTS

| | | | |
|---|---|---|---|
| 4,210,401 A | 7/1980 | Batten | |
| 4,931,657 A * | 6/1990 | Houston et al. | 250/559.08 |
| 2007/0153285 A1 | 7/2007 | Elton | |
| 2007/0206183 A1* | 9/2007 | Lebens | 356/237.2 |

FOREIGN PATENT DOCUMENTS

EP            2157401 A1    2/2010

* cited by examiner

*Primary Examiner* — Renee Chavez
(74) *Attorney, Agent, or Firm* — Epstein Drangel LLP; Robert L. Epstein

(57) ABSTRACT

A sensor (1) serves for capturing the moving material web (2). It has light sources (4, 4') and at least one light detector (10). The light sources (4, 4') generate emission light (5) having different polarization. The polarization state of the emitted light can be influenced by selecting or mixing the emission light (5) of the light sources (4, 4'). Markings such as for example metal strips (13) in the material web (2) can thus be captured with the light detector (10) without problem.

5 Claims, 1 Drawing Sheet

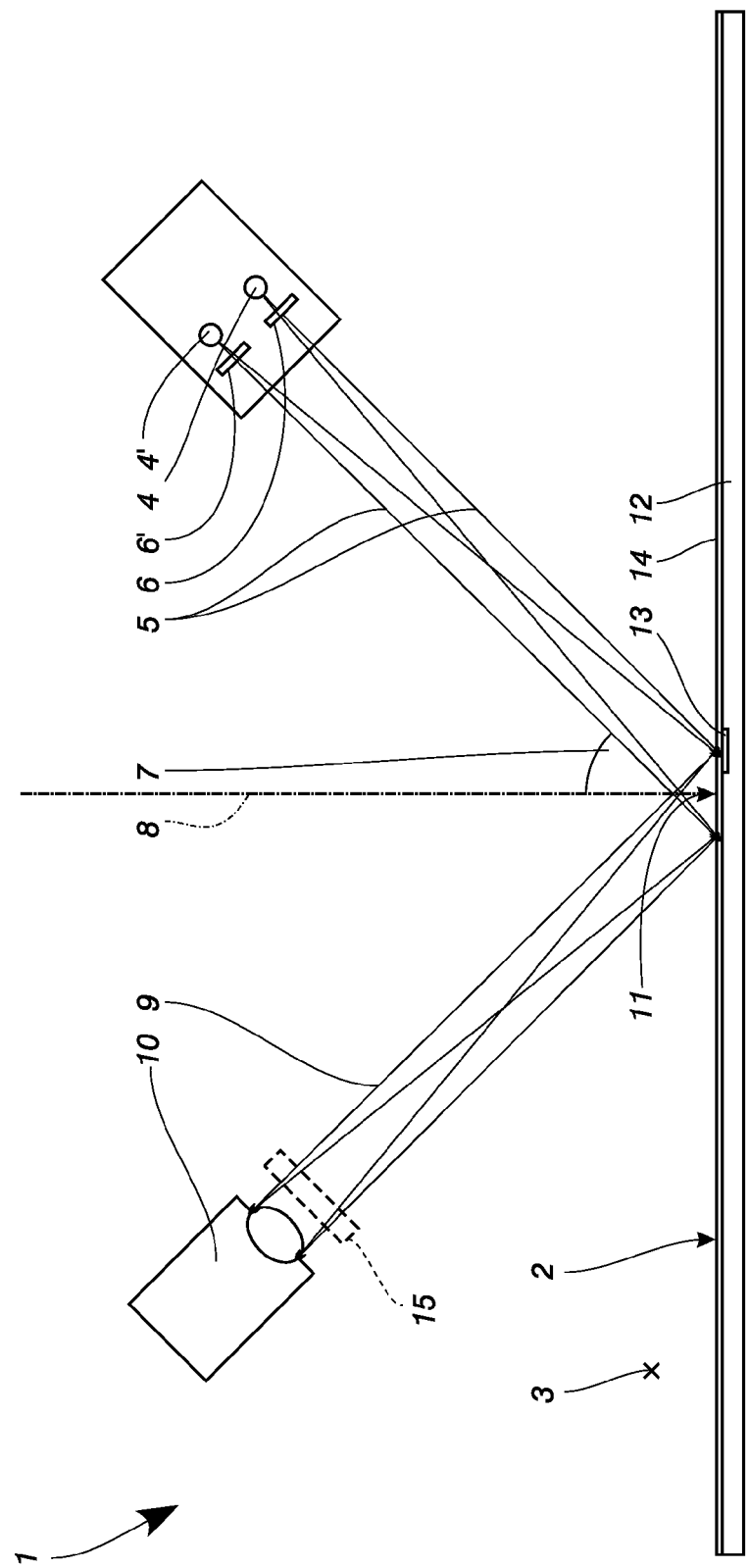

SENSOR FOR CAPTURING A MOVING MATERIAL WEB

The present application claims priority to European Patent Application no: EP 12 006 112.2, filed Aug. 28, 2012.

FIELD OF THE INVENTION

The invention relates to a sensor for capturing a moving material web, in particular for capturing the position of a moving material web.

DESCRIPTION OF THE PRIOR ART

US 2007/0153285 A1 discloses an ellipsometer for determining the optical reflection properties of samples. This ellipsometer can be operated with different laser light sources in order to permit wavelength-dependent analysis. The light incidence in this case is grazing, such that the incident light encloses an angle of nearly 90° with respect to the normal on the sample surface. The reflected light is focused onto a detector using a lens arrangement, which detector detects the integral luminous flux. The sample to be analysed is here assumed to be homogeneous over the analysed surface such that no markings or peripheral edges are detectable.

U.S. Pat. No. 4,210,401 discloses another ellipsometer, in which the angle of incidence and angle of reflection of the light can be varied in a range between 0° and nearly 90° with respect to the normal on a sample surface. This ellipsometer also assumes a homogeneous sample to be analysed such that capturing of markings or peripheral edges is not possible.

EP 2 157 401 A1 discloses an apparatus for measuring distances. Said apparatus consists of a light source and a light detector, which are decoupled via a beam splitter. Here, the light source transmits light through the beam splitter onto a sample to be investigated. Light reflected thereby is reflected by the beam splitter and guided to a detector. The distance of the sample from said apparatus is ascertained by capturing the time delay of the signals arriving at the detector.

EP 1 154 225 B1 discloses a generic sensor for capturing a peripheral edge of or a marking on a moving material web. This sensor has a directed light source and a diffuse light source, which illuminate the material web. The light reflected by the material web is captured by a light detector and converted into an electrical signal. Said sensor has proven itself many times in practice and constitutes the starting point of the present invention.

The invention is based on the object of providing a sensor of the type mentioned in the introduction, which makes possible reliable capturing of the web edge or of a marking on the material web even under unfavourable conditions.

This object is achieved according to the invention with the following features.

BRIEF SUMMARY OF THE INVENTION

A sensor according to the invention is used for capturing a moving material web, specifically in particular capturing the position of the material web on the basis of its edge or a marking provided on the material web. The sensor has light sources, which transmit emission light at the material web. It is not important in this case whether said light sources themselves are directed at the material web, or if the emission light is deflected, using optical means, such as for example mirrors, prisms, lenses or the like, such that it ultimately strikes the material web. What is crucial is only that at least a partial region of the material web is illuminated by the emission light. The sensor additionally has at least one light detector, which receives detection light. Said detection light is here emitted by the at least one light source and influenced by the material web. Possible influences are in particular reflection, absorption and transmission. These are dependent both on the optical properties and on the relative position of the material web with respect to the incident emission light. It is thus possible in principle to capture the position of the material web from the detection light that is reflected or transmitted by the material web.

In unfavourable cases it is possible, however, that the dependence of the detection light on the position of the moving material web is too small for the position of the material web to be ascertained from the detection light. For example, if the intention is to capture the position of a metal strip provided on the material web, wherein the entire material web is sprayed with clear varnish, only a relatively small contrast between the metal strip and the remaining material web is produced, which hinders reliable capturing of the position of the metal strip. In order to make possible reliable capturing of the position of the material web even under these more difficult conditions, the light sources are able to emit emission light having different polarization. Preferably, the emission light of the at least one of the light sources is polarized parallel to the plane of the material web, while the emission light of the at least one other light source is polarized perpendicular to the plane of the material web. These alignments are however not necessary. What is crucial is merely that the polarization properties as such are different. As a result, the polarization of the emission light overall can be varied by driving the light sources. Starting from the above-mentioned example, the light sources can be driven for example such that the emission light is polarized only perpendicularly. By driving the light sources with parallel polarization, the emission light by contrast is polarized parallel. By simultaneous driving of differently polarized light sources it is also possible to mix these polarization directions. It is here in principle not important whether the light sources themselves already transmit polarized light or if their unpolarized light is polarized by optical means. By appropriately choosing the polarization state using the control of the light sources, it is possible even under unfavourable conditions to reliably scan a marking on the moving material web. Provision is made in particular for the emission power of the light sources to vary such that a selected guidance criterion of the moving material web produces optimum contrast.

The least practical light sources provide polarized emission light. Therefore, it is advantageous if at least one polarization filter is provided between the at least one light source and the at least one light detector. Once again, "between" is here understood to mean "located in the beam path". The at least one polarization filter can be arranged between the at least one light source and the material web or between the material web and the at least one light detector. If a plurality of polarization filters are provided, they can also be arranged on both sides of the material web. Suitable polarization filters are for example plastic layers with aligned polymer chains, which absorb light of a particular polarization direction. Alternatively, polarization properties of dielectric and/or metallic boundary surfaces could also be used as polarization filters.

Alternatively or additionally, it is advantageous if the at least one light source is configured such that the emission light is linearly polarized. An additional polarization filter can thus be omitted. One example for a linearly polarized light source is a gas laser, which has a gas cuvette with inclined windows inside a laser resonator. A gas laser of this type can only emit linearly polarized light.

If the emission light or the transmission light strikes the material web at an acute angle with respect to a normal on the material web, the result is a strong dependence of the light reflection on the polarization direction in particular in the case of dielectric material webs or material webs with dielectric covering layers, such as for example clear varnish layers. It is thus possible to effectively scan difficult material webs by appropriately choosing the polarization direction or a corresponding mixing of different polarization directions.

A suitable angle for the acute angle has been found to be the Brewster angle. The Brewster angle depends only on the refractive index of the dielectric medium. If light strikes the material web exactly at the Brewster angle, light having a polarization direction which is parallel to the material web is not reflected. Therefore, the entire reflected light originates exclusively from the polarization that is perpendicular to the material web. Although this condition is no longer 100% true near the Brewster angle, the reflection of the parallel polarization is, however, extremely low in this region. It is thus not necessary to have the exact Brewster angle, rather the reflection is also very strongly polarization-dependent in a region around the Brewster angle. As a result, the detection light in this region of the angle of incidence has a very strong polarization dependence and can therefore be influenced well by the polarization element. For example it is possible in this manner to completely eliminate the reflection of the clear varnish.

BRIEF DESCRIPTION OF THE SEVERAL VIEWS OF DRAWINGS

Other advantages and characteristics of this invention will be explained in the detailed description below with reference to the associated FIGURES that contain several embodiments of this invention. The single FIGURE shows a schematic principle illustration of a sensor It should however be understood, that the figures are just used to illustrate the invention and do not limit the scope of protection of the invention.

DETAILED DESCRIPTION OF THE INVENTION

The single FIGURE shows a schematic principle illustration of a sensor 1. A sensor 1 according to FIG. 1 serves for capturing a moving material web 2, which moves along a direction of motion 3 which is directed towards the observer. The sensor 1 has two light sources 4, 4' which emit emission light 5. Arranged downstream of the light sources 4, 4' is a respective polarization filter 6, 6', which generate linearly polarized emission light 5. The emission light 5 that is thus polarized strikes the material web 2 at an acute angle 7 measured with respect to a normal 8. Part of the incident light is reflected by the material web 2, wherein the reflectivity depends both on the polarization state of the incident light and on the material properties of the material web 2. The reflected detection light 9 finally travels to a light detector 10, which is configured for example as a camera. An additional polarization filter 15 can optionally be arranged upstream of the light detector 10. This can be used to capture a detail 11 of the material web in a spatially resolved manner.

In the exemplary embodiment according to FIG. 1, the material web 2 consists for example of a polymer carrier 12, in which a metal strip 13 is embedded. This metal strip 13 consists for example of aluminium, but alternatively can also be made of any other metal. Provision is made for this metal strip 13 to be captured by the sensor 1, so that the material web 2 is guided depending on the position of the metal strip 13. This could be achieved in principle by a suitable choice according to a bright field or dark field illumination. In the present exemplary embodiment, the material web 2 is, however, additionally provided on the upper side with a clear varnish 14. This clear varnish 14 forms a dielectric layer on the surface of the material web 2, such that both bright field illumination and dark field illumination fail in the case of this material web type.

In order to still capture the position of the metal strip 13 in the light detector 10, the light sources 4, 4' are controlled in a variable manner. This results in different polarization states of the emission light. In this manner, the polarization of the emission light 5 can be changed such that the metal strip 13 is capturable in the light detector 10 with high contrast.

Since some of the embodiments of this invention are not shown or described, it should be understood that a great number of changes and modifications of these embodiments is conceivable without departing from the rationale and scope of protection of the invention as defined by the claims.

REFERENCE SYMBOL LIST 1 sensor
2 material web
3 direction of motion
4, 4' light source
5 emission light
6, 6' polarization filter
7 acute angle
8 normal
9 detection light
10 light detector
11 detail
12 polymer carrier
13 metal strip
14 clear varnish
15 polarization filter

The invention claimed is:

1. A device comprising a moving material web and a sensor for sensing a moving material web, said moving material web having a marking provided thereon, and a region outside said marking, said marking comprising a metal strip, said marking and said region outside said marking being situated under a layer of clear varnish, said marking having a position being detected by said sensor, wherein said sensor comprising light sources, each of them transmitting emission light at said material web and said emission light being influenced by said material web producing detection light, said sensor further comprising at least one light detector, which receives said detection light, wherein in order to achieve a high contrast between said region outside said marking of said material web and said marking, said emission light of said light sources having different polarization, said emission light of said light sources is added to a total emission light, having a total polarisation, which is varied by controlling said light sources, and said at least one light detector is configured as a camera.

2. The device according to claim 1, wherein at least one polarization filter being provided between said light sources and said at least one light detector.

3. The device according to claim 1, wherein at least one of said light sources being configured such that it emits linearly polarized emission light.

4. The device according to claim 1, wherein said material web having a normal and said emission light strikes said material web at an acute angle with respect to said normal on said material web.

5. The device according to claim 4, wherein said acute angle corresponds to the Brewster angle.

\* \* \* \* \*